United States Patent Office 3,606,946
Patented Sept. 21, 1971

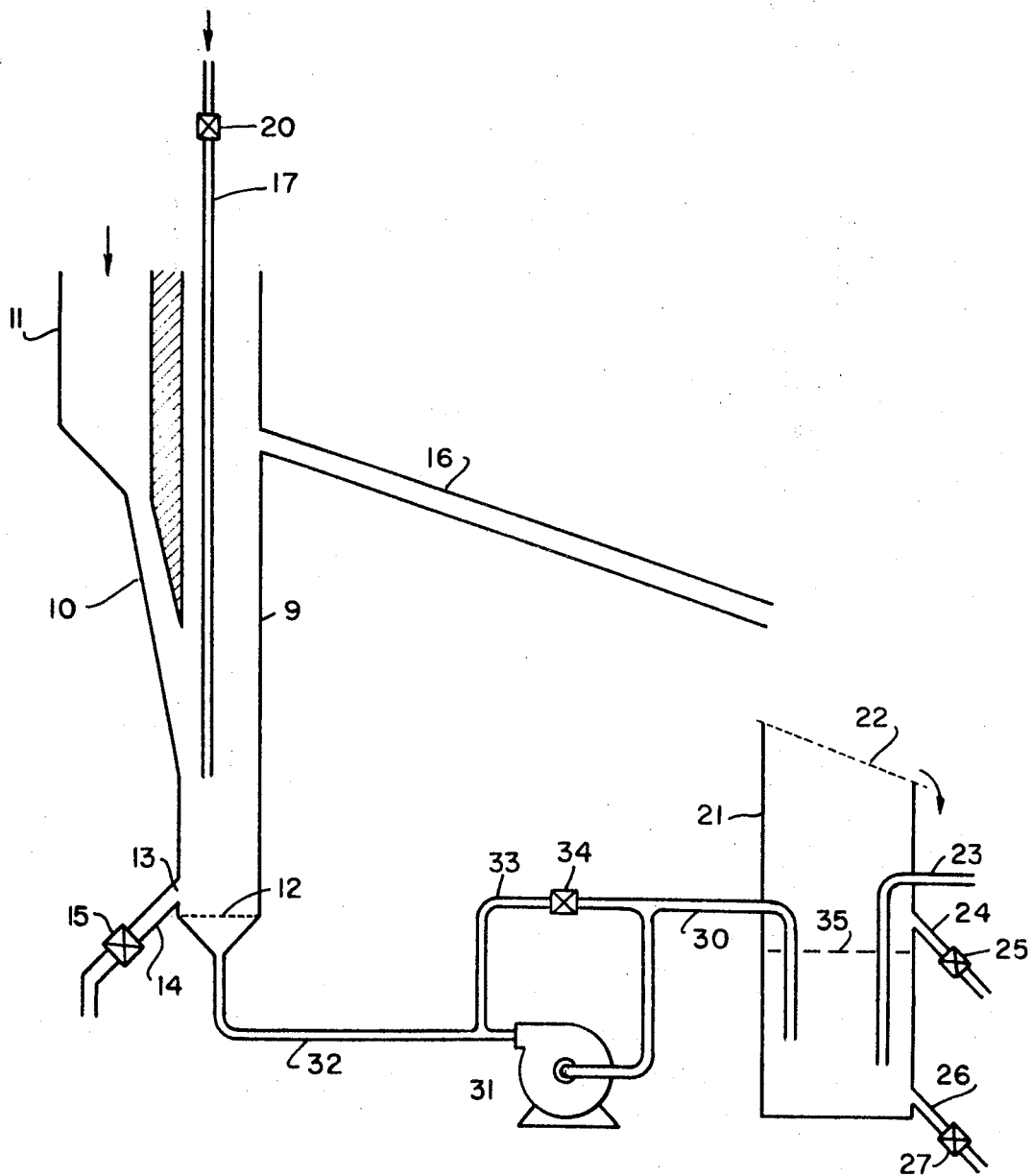

3,606,946
METHOD FOR SEPARATING MACHINED COMPONENTS FROM SHAVINGS BY EBULLITION
Frederick A. Zenz and Fredric E. Zenz, both of Bryant Ave., Roslyn Harbor, N.Y. 11577
Filed Feb. 24, 1969, Ser. No. 801,399
Int. Cl. B03b 3/34
U.S. Cl. 209—10                           2 Claims

ABSTRACT OF THE DISCLOSURE

A method for separating manufactured components and pieces such as rivets, screws, and other precision components from shavings and chips produced in the machining operation by ebullition.

---

The invention relates to a method for separating manufactured pieces such as screws and rivets from the shavings and chips produced in the machining operation. More specifically it relates to such method wherein the separation is effected by ebullition of a liquid into which the desired product and the admixed chips and shavings are introduced.

Small precision components manufactured for example in screw machine operations from metal, plastic, or other machinable materials often emerge from the machining operation in admixture with a preponderant volume of extraneous matter in the form of shavings or chips. Of course, the manufactured components have to be separated from the shavings and the latter discarded as scrap.

Existing methods of separation are not always suitable or effective. Screening the product and shaving through controlled aperture sieves can accomplish some degree of separation, but if the size of the manufactured component is of the same order as that of the shavings, the process is inefficient if at all possible. Elutriation of either the manufactured component or the shavings from the mixture of the two is equally ineffective because the free space or porosity of the mass is so great that a stream of air sufficient to blow out either the machined components or the shavings will usually lift both. Elutriation techniques are particularly ineffective with highly porous masses since the air flow does not cause any agitation and the desired components caught in a tangle of shavings are not separated therefrom; neither components nor shavings will be individually lifted or allowed to remain unmoved and hence there is no separation. Similar elutriative methods using liquid as a medium have failed for similar reasons.

A technique of partially crushing a matte of components plus shavings to reduce the shavings to a smaller size or into chips and then sprinkling the resulting mixture of components and chips into a high velocity air stream will achieve a partial separation of the fluffier shavings and lighter chips from the more solid, heavier machined components. This technique in conjunction with a subsequent screening produces enough of a separation to make further hand picking reasonably feasible, though cumbersome and time consuming.

The present invention is intended to achieve a highly efficient separation of machined components from the shavings and chips resulting from the machining operation without resort to partial crushing of the matte of components and shavings or hand picking of the partially separated components. The partial crushing operation is particularly undesirable since it subjects the desired components, which may be delicate, precision products, to a crushing action that may physically damage the components.

The object of the invention is to provide an improved method for separating small machined components from the shavings and chips produced in the machining operation.

In carrying out the present invention the mixture of machined components and shavings and chips is introduced into a vertical column of water or other liquid. An air tube feeds air to the bottom of the column of water and the resulting ebullition agitates the mixture to separate the denser components from the lighter shavings and chips. The bubbles of air, in rising, merge to a bubble of a size that produces a slugging action which carries a mass of water and shavings to an overflow conduit which carries the shavings to a scrap receptacle and the water to a reservoir and pump that returns it to the bottom of the column of water.

The method of this invention is thus seen to be simple, economical, rapid in effecting separation of components from shavings, and continuous in operation. Other features and advantages may be gained from the foregoing and from the description of a preferred embodiment of the invention which follows.

In the single figure of the drawing, there is diagrammatically shown an apparatus for carrying out the method of the present invention.

Referring now to the drawing there is shown a vertical tower 9 having a feed pipe 10 for introducing a mixture of components and shavings to the bottom portion of the tower. A hopper 11 is provided to store the mixture to be separated and a valve mechanism (not shown) may be used to control the introduction of the mixture into the feed pipe. A porous element 12 is provided at the bottom of tower 9 as shown. It may be a fine mesh screen or a coarse fabric sheet through which liquid can flow but which will catch and hold the components separated from the mixture of components and shavings.

A drawoff opening 13 and conduit 14 are provided at the lower end of the tower just above the porous element 12 to enable the separated components to be removed from the tower after they have been effectively separated in the manner to be described. A valve 15 is provided in conduit 14. An overflow pipe 6 is located at the upper end of the tower and it is through this pipe that the shavings are removed.

A sparger tube 17 is positioned within the tower and it extends almost to the bottom of the tower. Tube 17 may be mounted for vertical movement so that its position within the tower can be controlled. A suitable valve 20 will be connected in the tube 17 to control the amount of air passing through the sparger.

Below the output end of pipe 16 there is a reservoir tank 21 having a screen cover 22. The screen will catch the separated shavings passing through pipe 16 and by inclining the screen the shavings will slide into a scrap hopper. A vibrating device may be provided to vibrate the screen and thus facilitate the removal of the shavings therefrom.

The reservoir itself will contain a liquid such as water or perhaps a solvent for dissolving the machining oil on the mixture of components and shavings, thus insuring that the separated components are cleaned during the separation process. An inlet pipe 23 is provided to feed fresh liquid into the system.

A drawoff pipe 24 is located near the top of reservoir 21 and it serves the purpose of enabling the machining oil that has been washed off the mixture of components and shavings to be skimmed from the surface of the water in the reservoir. A valve 25 is connected in the drawoff pipe. A drain pipe 26 and valve 27 are provided at the bottom of the reservoir and they permit the circulating liquid to be drained should it become contaminated and have to be replaced. Also any small chips that pass through screen 22 can be removed through pipe 26.

An outlet line 30 for the liquid in the reservoir leads to a pump 31, and from the pump a line 32 leads to the bottom of tower 9. A bypass line 33 and valve 34 completes the basic system being disclosed.

In operation, reservoir tank 21 is filled with water through feed pipe 23 to a level 35 about midway between drawoff pipe 24 and drain pipe 26. Valves 15, 20, 25, and 27 are closed and valve 34 in bypass line 33 is opened. The pump 31 is then started. Thereafter valve 34 is slowly closed until the pump starts liquid flowing upwardly in tower 9 at a rate of 0.25 to 1.00 ft./sec.

The flow rate may be varied depending on the density and other characteristics of the materials to be separated. Once established, this liquid flow may remain constant during operation of the apparatus.

Valve 20 is next opened to allow air to emerge from sparger 17 as a continuous stream of bubbles. For proper functioning of the apparatus the bubbles must be of sufficient size and quantity to effect a vigorous agitation of the mixture of components and shavings fed to the bottom of tower 9. The agitation must be such as to shake the desired components free from the mass of shavings in which they are trapped thus allowing the components to settle through the gently flowing liquid onto screen 12.

The tower is proportioned between screen 12 and overflow pipe 16, i.e., the height to diameter ratio is determined, such that the bubbles coming from the end of sparger 17 will merge as they rise to form in effect a single bubble as wide as the tower. This will result in a slugging action whereby liquid farther up the tower will be moved as a mass up the tower to overflow pipe 16. The air bubbles bridging the tower push the liquid slugs upwardly at velocities greater than the settling rate of the shavings and chips within the liquid slugs. Consequently, any shaving in the liquid will be carried to the overflow pipe and onto screen 22 and thence to the scrap bin. The liquid of course will pass through the screen into reservoir tank 21 for recirculation through the apparatus.

As the mixture of components and shavings continues to be fed into tower 9 through pipe 10 the agitation caused by the sparger shakes the components loose of the mass; it also effectively cleans the components (and shavings) of any machining oil thereon. As the components accumulate on screen 12, they can be removed periodically by opening valve 15 and flowing them out to a collection bin.

The shavings in the meantime are piling up in the tower and eventually reach a height where the upper portion of them are caught in the slugging action of the liquid and carried to overflow pipe 16. The cutting oil washed from the components and shavings is also carried through the overflow pipe back to reservoir tank 21 where it collects on the surface of the liquid. It is drawn off from time to time through pipe 24. If the criculating liquid is a solvent for the oil rather than an immiscible liquid, the oil can be recovered by distillation processes if it becomes economically justifiable to do so.

Having thus described the invention, it is clear that many variations and changes can be made in the preferred embodiment without departing from the spirit and scope of the invention. Hence it is to be understood that the specification and drawing are to be interpreted in an illustrative rather than in a limiting sense.

What is claimed is:

1. The method of separating machined components from shavings and chips produced in the machining operation, said method comprising the steps of introducing a mixture of components and shavings into a column of liquid, flowing liquid into the bottom of the column at a rate that allows separated components to settle to the bottom of the liquid column, and subjecting the mixture to a stream of gas bubbles of a size and quantity sufficient (a) to effect vigorous agitation of the mixture to shake the machined components free from the shavings and chips, thereby permitting the separated components to settle to the bottom of the liquid column, and (b) to thereafter merge into a single bubble that bridges the column of liquid and propels the liquid therein upwardly in the column as a slug of liquid, thereby carrying any shavings in the liquid slug to an overflow conduit.

2. The method of separating machined components from shavings and chips produced in the machining operation according to claim 1 including screening the shavings and liquid removed from the column of liquid and recirculating the liquid back to the bottom of the column of liquid.

References Cited

UNITED STATES PATENTS 3,298,519   1/1967   Hollingsworth _____ 209—170X

FOREIGN PATENTS 451,117   9/1948   Canada.

OTHER REFERENCES

Perry, Robert H., Chemical Engineers' Handbook, 4th ed., New York, McGraw-Hill Book Company, 1963, pp. 5–38, 5–39.

FRANK W. LUTTER, Primary Examiner

R. J. HILL, Assistant Examiner

U.S. Cl. X.R.

209—159